(12) United States Patent
Inomata

(10) Patent No.: US 6,426,693 B1
(45) Date of Patent: Jul. 30, 2002

(54) EMERGENCY REPORTING APPARATUS WITH SELF-DIAGNOSTIC FUNCTION

(75) Inventor: Jin Inomata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/424,060

(22) PCT Filed: Jul. 30, 1998

(86) PCT No.: PCT/JP98/03404

§ 371 (c)(1),
(2), (4) Date: Nov. 18, 1999

(87) PCT Pub. No.: WO00/07158

PCT Pub. Date: Feb. 10, 2000

(51) Int. Cl.$^7$ ................................................. B60Q 1/00
(52) U.S. Cl. ..................... 340/425.5; 340/522; 340/539; 340/825.49; 343/760; 455/134
(58) Field of Search .............................. 340/425.5, 426, 340/514, 522, 539, 903, 933, 825.35, 825.36, 825.49; 343/725, 729, 760, 893, 894, 711, 712, 713, 715; 455/82, 83, 134

(56) References Cited

U.S. PATENT DOCUMENTS

| | | | | |
|---|---|---|---|---|
| 4,499,606 A | * | 2/1985 | Rambo | 455/277 |
| 4,897,643 A | * | 1/1990 | Shibata et al. | 340/825.69 |
| 4,977,615 A | * | 12/1990 | Suzuki et al. | 455/277 |
| 5,159,707 A | * | 10/1992 | Mogi et al. | 455/134 |
| 5,218,367 A | * | 6/1993 | Sheffer et al. | 342/457 |
| 5,939,975 A | * | 8/1999 | Tsuria et al. | 340/426 |

FOREIGN PATENT DOCUMENTS

| | | |
|---|---|---|
| JP | 4-123954 | 4/1992 |
| JP | 4-123955 | 4/1992 |
| JP | 4-127400 | 4/1992 |
| JP | 4-231238 | 8/1992 |

\* cited by examiner

*Primary Examiner*—Edward Lefkowitz
*Assistant Examiner*—Davetta W. Goins
(74) *Attorney, Agent, or Firm*—Sughrue Mion, PLLC

(57) ABSTRACT

A emergency communication device which performs self diagnosing by repeatedly transmitting a weak signal, which can only be received by an antenna, among a plurality of antennas in a fixed time interval. When the weak signal is not received due to the occurrence of an accident, theft or the like, the occurrence of the emergency is communicated to an emergency data receiving center.

12 Claims, 4 Drawing Sheets

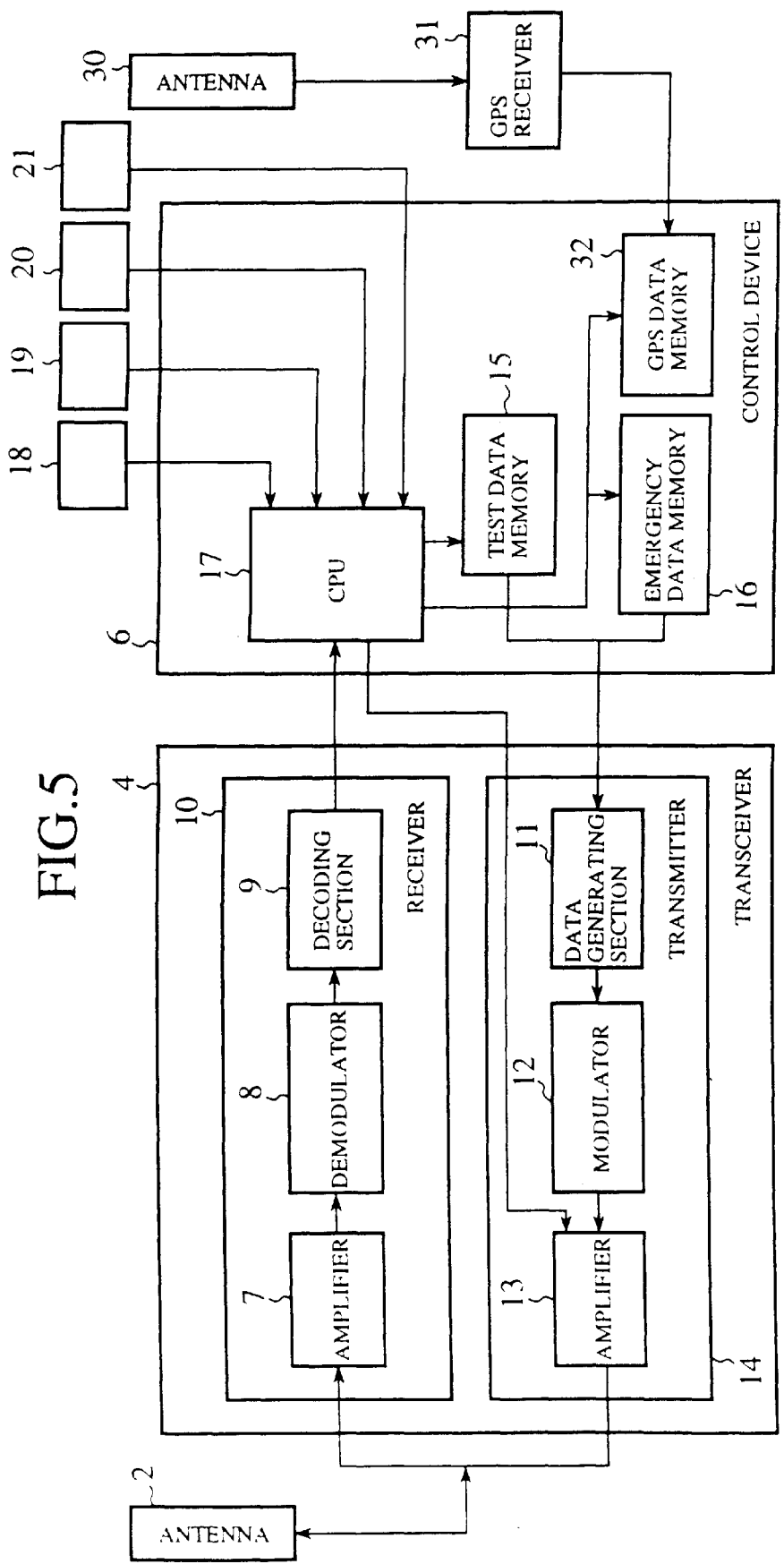

EMERGENCY REPORTING APPARATUS WITH SELF-DIAGNOSTIC FUNCTION

FIELD OF THE INVENTION

The present invention relates to an emergency communication device which is mounted in a mobile body such as a vehicle, especially an automobile, and which transmits emergency data by radio waves as a mobile center to an emergency communication receiving center when an emergency such as an accident or theft has occurred. More particularly the present invention relates to an emergency communication device provided with a self-diagnosing function which performs self diagnosis by repeatedly transmitting and receiving (hereafter transceiving) test data under normal conditions.

BACKGROUND OF THE INVENTION

A Conventional type of emergency communication device executes communication of emergency data to an emergency communication receiving center when a vehicle in which the device is mounted encounters an accident and the device is either automatically detects the accident or is activated by the driver pushing an emergency communication button, or when a communication antenna is broken due to the vehicle being stolen. Although such emergency communication devices are not widely used, there is no point if the device fails during use in such an emergency as above. Furthermore if the antenna is broken, communication can not be performed.

A conventional example of an emergency communication device provided with a self diagnosing function is provided by JP-A-4-123954. The device provide a plurality of antennas in a vehicle. The respective antennas are continuously switched between transmitters and receivers in fixed time intervals. Transmission from the switched antennas with an emergency communication receiving center by test data is repeatedly carried out through a circuit. The transmission/reception state is monitored and when an antenna which can receive is paired with one which can not, that is to say when the device is faulty or some other kind of emergency has occurred, an antenna which can receive transmits emergency data to an emergency communication receiving center.

Since conventional emergency communication devices are constructed as above, the situation arises that since self diagnosis is carried out by repeatedly transceiving with an emergency communication receiving center using a circuit, the emergency communication receiving center uses many circuits for self diagnosis and so during a real emergency there maybe no available circuit. Moreover the problem has arisen that such self diagnosis using circuits requires considerable communication costs which raises use costs.

The present invention is proposed to solve the above problems by the provision of an emergency communication device which performs self diagnosis without the use of circuits and which immediately communicates with an emergency communication receiving center on the detection of a fault. Furthermore if the antenna is broken or when the vehicle stolen, the emergency communication receiving center is automatically advised of the theft and data is transmitted from the vehicle during the theft.

DISCLOSURE OF THE INVENTION

The self diagnosing emergency communication device of the present invention is provided with a plurality of antennas provided in a vehicle and a communication means which executes self diagnosis by repeatedly transceiving a weak signal which can only be received through an antenna from among said plurality of antennas. When the weak signal is not received, communication regarding the occurrence of an emergency is transmitted to an emergency communication receiving center by a strong signal.

Due to this structure, it is possible to perform self diagnosis without the use of circuits. No costs are involved in self diagnosis and so a low price is possible. Furthermore it is possible to leave circuits open in the emergency communication receiving center for a real emergency communication.

Of course, on the vehicle side during a fault, when an antenna is broken and the weak signal can not be received, the occurrence of an accident is transmitted to the emergency communication receiving center by another functioning antenna. As a result, since it is possible to immediately correct a fault, it is possible to accurately advise of an emergency situation. Furthermore when the vehicle is stolen, appropriate measures are immediately performed by the emergency communication receiving center and at the same time on the basis of the transmission, it is possible to notify persons in the vicinity of the vehicle of the theft. Thus it is possible to prevent the theft from occurring.

Furthermore by performing the transceiving of a weak signal at fixed intervals, it is possible to reduce the deterioration of a battery which acts as a power source.

Furthermore the communication means of the self diagnosing emergency communication device of the present invention is combined with an alarm or a display device or both.

As a result of this structure, it is possible to accurately and easily notify persons in the vicinity of a theft broadcast.

The self diagnosing emergency communication device of the present invention is provided with a GPS receiver which detects a position of the vehicle, a plurality of antennas which are provided in the vehicle, and a communication means which executes self diagnosis by performing the transceiving of a weak signal which can only be received by an antenna from among said plurality of antennas and which when said weak signal is not received, transmits an emergency signal and a vehicle position data by a strong signal to the emergency communication receiving center based on the signal received by said GPS receiver.

As a result of this structure, it is possible to perform self diagnosis without the use of circuits. No costs are involved in self diagnosis and so a low price is possible. Furthermore it is possible to leave circuits open in the emergency communication receiving center for a real emergency communication.

When the weak signal can not be transceived due to damage to or breakage of the antenna, since the emergency communication receiving center is notified of the emergency by another functioning antenna, it is possible to accurately advise of an emergency situation. Furthermore when the vehicle is stolen, appropriate measures are immediately performed by the emergency communication receiving center and at the same time on the basis of the transmission, it is possible to notify persons in the vicinity of the vehicle of the theft. Thus the theft may be prevented. Furthermore since it is possible to notify the emergency communication receiving center of the position of the accident or the position of the stolen vehicle based on the received signal from the GPS receiver, it is possible to quickly perform measures appropriate to the emergency situation.

The self diagnosing emergency communication device of the present invention is provided with transceivers which are respectively connected to a plurality of antennas and a control section which controls the transmitting and receiving of each transceiver.

Due to this arrangement, it is possible to perform self diagnosis smoothly using the respective transceivers as receivers and transmitters without the necessity of a switching means.

The self diagnosing emergency communication device of the present invention is provided with a transceiver transfer means which alternately connects the transmitters and receivers to the plurality of antennas and a control means which controls the transceiving of the transmitters and receivers.

Due to this arrangement, it is possible to simplify the structure for self diagnosis since it is possible to perform self diagnosis only using one transmitter and one receiver with respect to the plurality of antennas.

The control section of the self diagnosing emergency communication device of the present invention is provided with a GPS data storage means which stores calculated vehicle position data based on the signal received by the GPS receiver, a test signal generation means, a emergency data storage means and a CPU which regulates signal level so as to reduce the field level of a transmitted signal during a transmission signal test and to raise the field level of a transmitted signal during the transmission of an emergency signal.

By the above arrangement, the controller can easily transmit emergency data and transceive signals for self diagnosis.

The control section of the self diagnosing emergency communication device of the present invention is provided with a correspondence means which matches based on the instruction data from the emergency communication receiving center received by a receiver.

Due to this arrangement, when becoming lost while driving, it is possible to receive instructions regarding the route by voice messages from the emergency communication center for example by using a radio speaker in the vehicle.

BRIEF DESCRIPTION OF THE FIGURES

FIG. 5 is a block diagram which shows the structure of a control section and transceiver in FIG. 4.

PREFERRED EMBODIMENTS OF THE INVENTION

The preferred embodiments of the present invention will be explained in detail below with reference to the accompanying figures.

Embodiment 1

Figure 1:
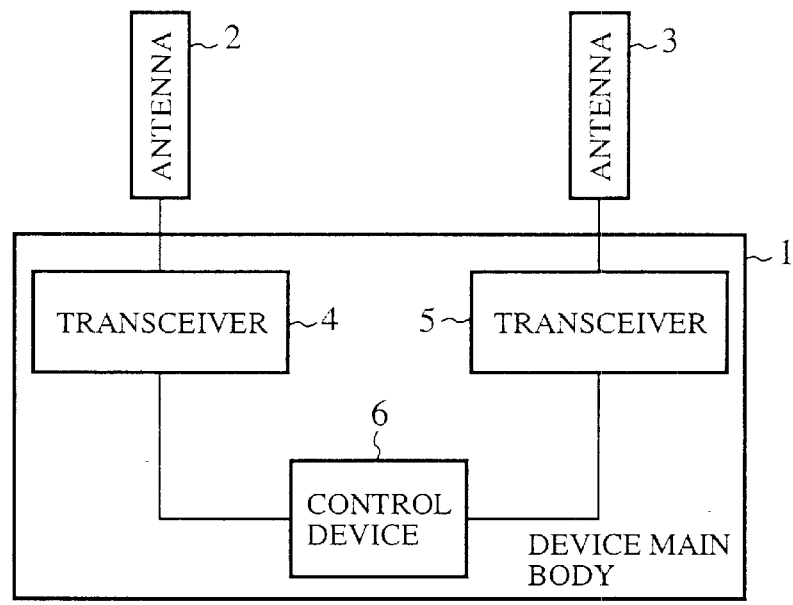
FIG. 1 is a block diagram showing an emergency communication device provided with a self diagnosing function according to a first embodiment of the invention.

FIG. 1 is a block diagram showing an emergency communication device provided with a self diagnosing function according to a first embodiment of the invention. In the figure, reference numeral 1 denotes a device main body, 2, 3 are antennas provided on the device main body 1. These antennas 2, 3 are connected to transceivers 4, 5 in the device main body 1. 6 is a control section which controls the transceivers 4, 5.

Figure 2:
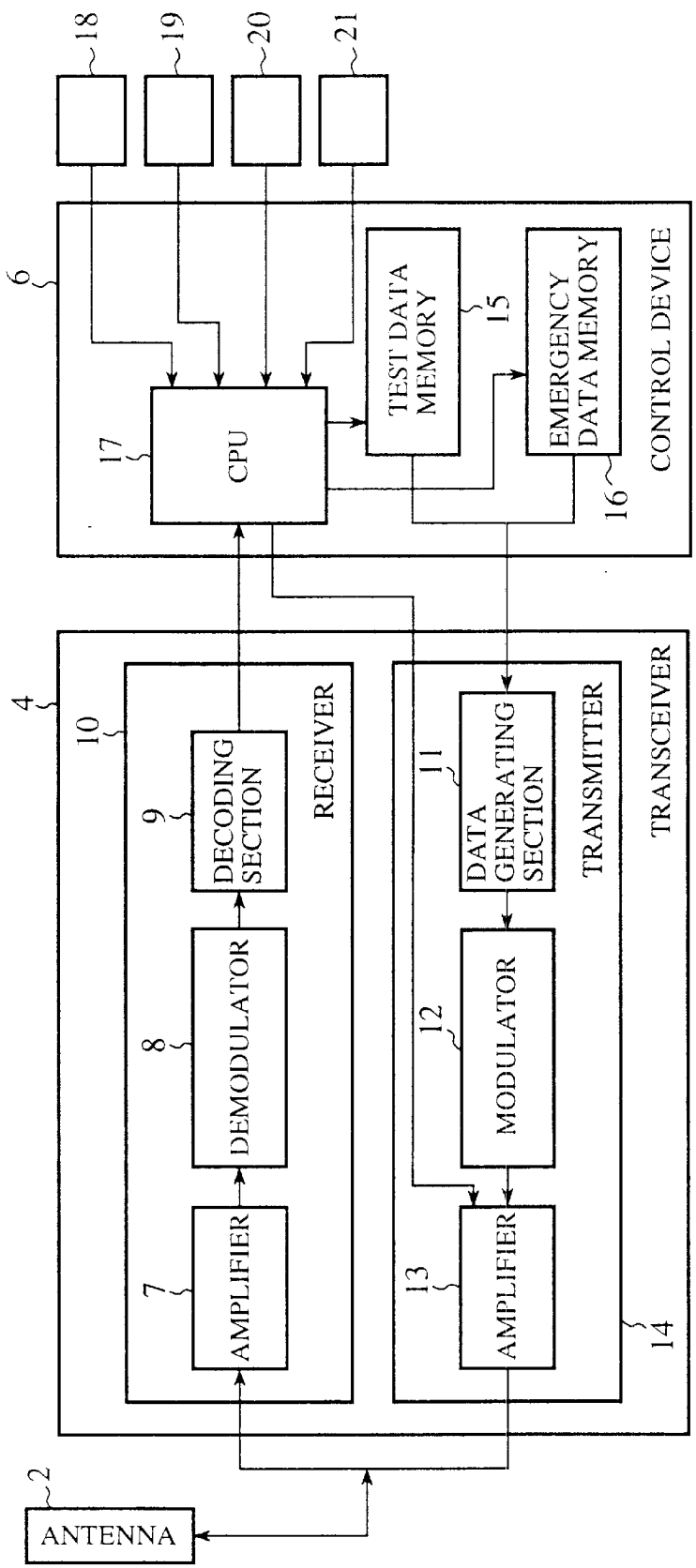
FIG. 2 is a block diagram which shows the structure of the control section and the transceiver in FIG. 1.

The above transceiver 4 as shown in FIG. 2 for example, is comprised of an amplifier 7 which amplifies a received signal, a demodulator 8 which demodulates a received signal, a receiver 10 which comprises a decoding section 9, a data generating section 11, a modulator 12 which modulates such data, and a transmitter 14 which comprises amplifier 13 which amplifies a signal transmitted from the modulator 12. Other components of the transceiver 5 are the same as those in the transceiver 4 and will not be explained again.

The control section 6 as shown in FIG. 2 for example, has a test data memory 15, an emergency data memory 16, and a CPU 17 which acts as a central processing means and to which is connected a sensor 18 which detects whether a door lock is unlocked, a sensor 19 which detects whether a door is open, a sensor 20 which detects whether vibrations are applied to the vehicle when it is not in use, and a sensor 21 which operates an emergency operation member which operates when the vehicle is stolen.

The operation of the invention will be explained below.

The control section 6 under normal conditions operates for example a transmitter 14 in the transceiver 4, reduces the amplified gain of an amplifier 13 which is provided and transmits a test data read from the test data memory 15 from an antenna 2 as a weak signal which can only be received by an antenna. The transmitted signal is received by an antenna 3 of another transceiver 5 and is input into the receiver 10 of the transceiver 5.

Then the control section 6 operates a transmitter 14 of the transceiver 5 which operated the receiver on the previous occasion, reduces the amplified gain of the stored amplifier 13, and transmits a test data read from the test data memory 15 from an antenna 2 as a weak signal which can only be received by an antenna. The transmitted signal is received by an antenna 2 of another transceiver 4 and transceiving is alternately repeated as if input into the receiver 10 of the transceiver 4. Thus self diagnosis is performed by the transceiving of weak signals between the closely disposed antennas 2, 3.

If one of the transceivers is faulty and the other transceiver can not receive test data a fixed number of times, the CPU 17 raises the amplified gain of the amplifier of the transceiver which is not faulty, raises the field level of the transmitted signal and transmits emergency data read from the emergency data memory 16 to the emergency data receiving center from an antenna. At the same time, the driver is alerted by a lamp in the case of a display or a buzzer in the case of an alarm. Furthermore a protector is applied to the microprocessor which controls the engine so that the engine can not be operated. However it is possible to release the above protector by the use of a code, for example by operating the blinkers three times, in order to operate the engine.

Since the transceivers 4, 5 above are directly connected to the power source so as to operate under normal conditions, when the transmission of normal test data is repeated, the deterioration of the battery which acts as a power source often occurs. Thus the transceiving of test data is repeatedly performed at set times or intermittently based on the signals from the sensor detecting that a door is unlocked, or the sensor detecting that a door is open or the like.

As shown above, according to the first embodiment of the invention, self diagnosis is performed by repeatedly transceiving a weak signal between adjacently disposed antennas 2,3 and periodically checking transceivers 4, 5. Thus it is possible to perform self diagnosis at a low cost without the need to use circuits to perform such self diagnosis and at the same time it is possible effectively use the circuits of the emergency communication receiving center. Furthermore it is always possible to operate the device normally when necessary and accurately perform the function of an emergency communication device.

Embodiment 2

Figure 3:
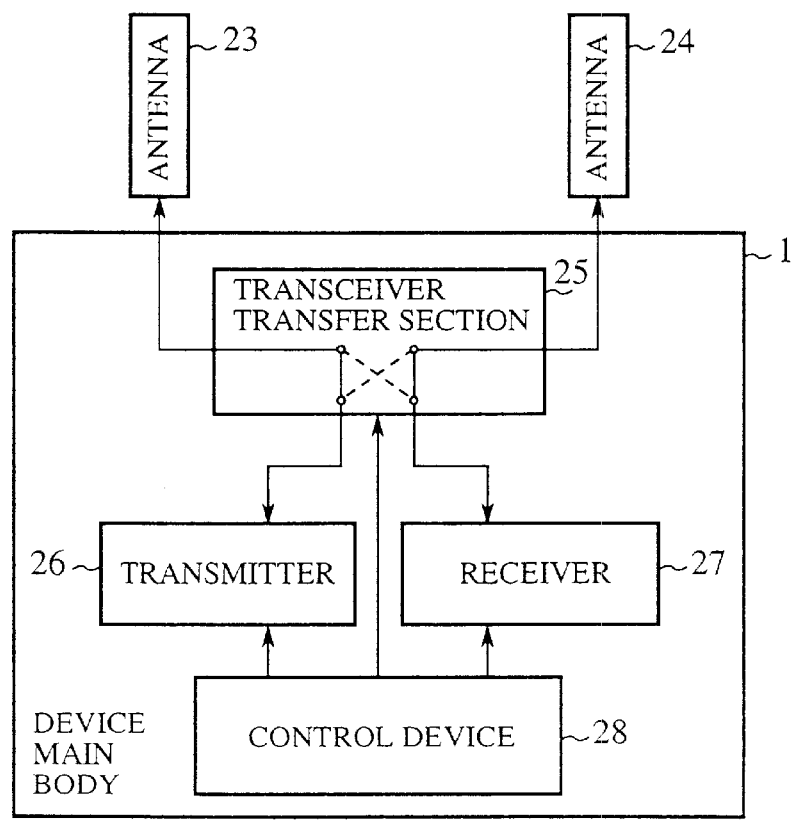
FIG. 3 is a block diagram which shows an emergency communication device provided with a self diagnosing function according to a second embodiment of the invention.

FIG. 3 is a block diagram which shows an emergency communication device according to a second embodiment of the invention. In the figure, 23, 24 are antennas, 25 is a transceiver transfer section which alternately switches the antennas 24 to transmitters 26 and receivers 27. 28 is a control section which controls the transmitter 26 and the receiver 27. The internal components are the same as those of the controller 6 shown in FIG. 2.

The operation of the invention will now be explained.

Under normal conditions, the transmitter 26 is connected to the antenna 23 by the transceiver transfer section 25, the amplifier gain of the stored amplifier is reduced, and test data is transmitted from an antenna 23 in a weak signal that can only be received by an antenna. This transmitted signal is received by the receiver 27 through another antenna 24. The controller 28 switches the transceiver transfer section 25 and connects the receiver 27 to the antenna 23. The transmitter 26 is connected to the antenna 24, the amplifier gain of the stored amplifier is reduced, and test data is transmitted from an antenna 24 in a weak signal that can only be received by an antenna. The antennas 23, 24 are connected alternately to the transmitter 26 and the receiver 27 through the transceiver transfer section 25 so that the transmitted signal is received by the receiver 27 through the other antenna 23. Transmission of a weak signal is repeated between the antennas 23, 24 and self diagnosis is performed.

As shown above, according to embodiment 2, simplification of circuitry, reduction in product size and a low price are possible since the self diagnosis is enabled with a single transmitter 26 and a single receiver 27 as the device is adapted so that the antennas 23, 24 are alternately switched continuously to the transmitter 26 and the receiver 27 by the transceiver transfer section 25.

If a thief breaks one of the antennas, test data will not be transmitted to the other antenna for a fixed number of times. Thus the CPU 17 raises the amplifier gain of the amplifier in the transceiver which is not damaged, raises the field level of the transmitted signal and sends emergency data read from the emergency data memory 16 from the antenna which is not broken to the effect that a theft is being performed to the emergency data receiving center. At the same time, an alarm is conveyed to the surroundings of the vehicle by a lamp or buzzer or the like. Furthermore a protector is applied to the microprocessor which controls the engine so that the engine can not be operated and thus the theft can be prevented.

Embodiment 3

Figure 4:
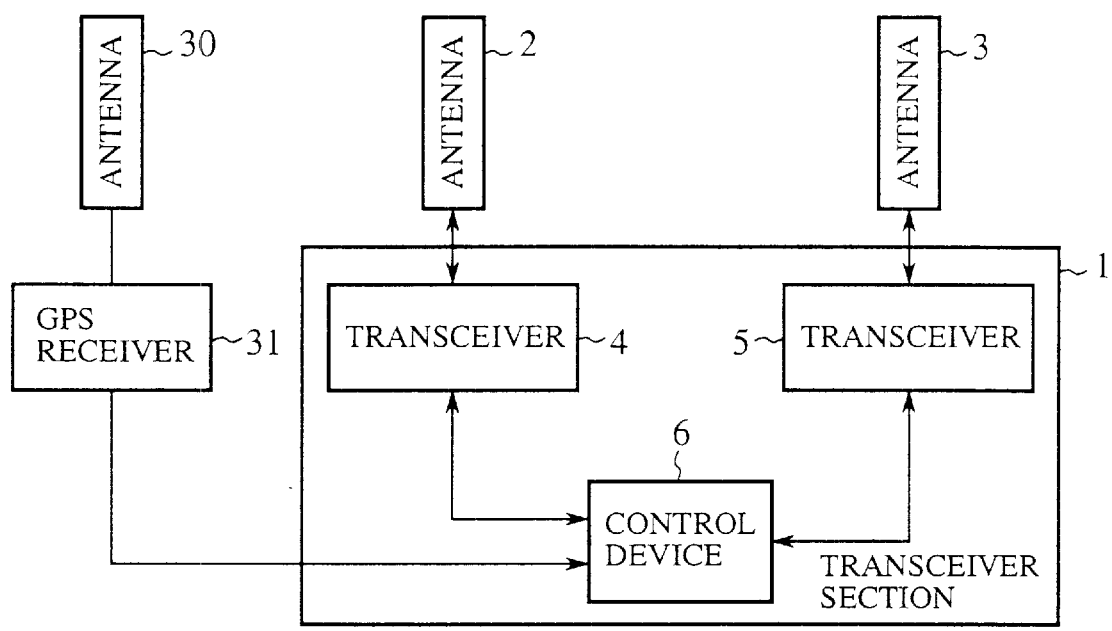
FIG. 4 is a block diagram which shows an emergency communication device provided with a self diagnosing function according to a third embodiment of the invention.

FIG. 4 is a block diagram which shows an emergency communication device according to a third embodiment of the invention. In the figure, 30 is a GPS receiving antenna, 31 is a GPS receiver which is connected to the GPS receiving antenna 30. The controller 6 as shown in FIG. 5, is provided with a GPS receiver data memory 32 which stores GPS received data. Other components are the same as those of the first embodiment as shown in FIGS. 1 and 2 and are designated by similar reference numbers and so will not be explained here.

The operation of the invention will now be explained.

The controller 6 operates the transmitter 14 of the transceiver 4 during normal operation. The amplifier gain of the stored amplifier 13 is reduced, and test data read from the test data memory 15 is transmitted from an antenna 2 in a weak signal that can only be received by an antenna. This transmitted signal is received by the antenna 3 of the other transceiver 5 and is input into the receiver 10 of the transceiver 5.

Then the controller 6 operates the transmitter 14 of the transceiver 5 which operated the receiver on the previous occasion. The amplifier gain of the stored amplifier is reduced, and test data read from the test data memory 15 is transmitted from an antenna 3 in a weak signal that can only be received by an antenna. The transmitted signal is received by the antenna 2 of the other transceiver 4. The transceiving signal is alternately repeated as if input into the transceiver 4 which operated the receiver 10. Thus transceiving is performed with a weak signal between antennas 2, 3 which are placed in proximity and self diagnosis is performed.

If one of the transceivers is faulty, test data will not be received by the other transceiver for a fixed number of times. Thus the CPU 17 of the controller 6, raises the field level from the antenna connected to the transceiver which is not damaged and that is to say it sends emergency data in a strong signal to the emergency data receiving center. At the same time, an alarm is conveyed to the surroundings of the vehicle by a lamp or a buzzer.

Furthermore when a theft or an accident occurs, vehicle position data and emergency data is transmitted to the emergency data receiving center in a strong signal based on the GPS signal received by the GPS receiver. At the same time, a protector is applied to the microcomputer of the engine control so that the engine can not be activated. As a result, it is possible to supply stolen vehicle positional data or accident data to the police while tracing the stolen vehicle. Thus it is possible to prevent the theft.

Industrial Applicability

As shown above, the emergency communication device provided with a self diagnosing function of the present invention determines on the basis of self diagnosis whether the device is functioning normally or not. When the antenna of the vehicle in which the device is mounted is broken in the course of an attempted theft or when an accident has occurred, it is possible to automatically advise an emergency communication center of the emergency data and as a result it is possible to quickly effect necessary action.

What is claimed is:

1. An emergency communication device which performs emergency communication when a vehicle has encountered an emergency situation, said emergency communication device being provided with a self diagnosing function and comprising:

a plurality of antennas which are provided in said vehicle, and communication means for repeatedly transmitting and receiving a weak signal between selected ones of said plurality of antennas without communicating with a remote device, and reporting the occurrence of an emergency to an emergency communication receiving center as a strong signal when transmission and reception of the weak signal is not achieved.

2. An emergency communication device provided with a self diagnosing function as defined by claim 1 wherein the transmission and reception of said weak signal is performed at fixed time intervals.

3. An emergency communication device provided with a self diagnosing function as defined by claim 1 wherein said communication means is combined with an alarm or a display or both.

4. An emergency communication device provided with the self diagnosing function as defined by claim 1 wherein said emergency communication device comprises a transceiving section connected respectively to said plurality of antennas, and a controller which controls the transmission and reception of each transceiver.

5. An emergency communication device provided with the self diagnosing function as defined by claim 1 wherein said emergency communication device comprises a transceiver transfer section which alternately connects a transmitter and a receiver to said plurality of antennas and a controller which controls transmission and reception of said transmitter and said receiver.

6. An emergency communication device provided with a self diagnosing function as defined by claim 1 wherein said device further comprises a test data memory, an emergency data memory, and a CPU which regulates the signal level so that it lowers a field level of a transmission signal when transmitting test data and raises a field level of a transmission signal when transmitting emergency data.

7. An emergency communication device provided with a self diagnosing function which transmits emergency data to an emergency data receiving center when a vehicle has encountered an emergency, wherein said emergency communication device comprises a GPS receiver which detects a vehicle position, a plurality of antennas which are disposed in said vehicle, and communication means for repeatedly transmitting and receiving a weak signal between selected ones of said plurality of antennas without communicating with a remote device, and communicating emergency data and vehicle positional data to an emergency data receiving center as a strong signal based on a received signal in said GPS receiver when the weak signal is not received.

8. An emergency communication device provided with the self diagnosing function as defined by claim 7 wherein said device further comprises a GPS data storage means which stores vehicle positional data based on the received signal by GPS receiver, a test data memory, an emergency data memory and a CPU which regulates the signal level, wherein the CPU lowers a field level of a transmission signal when transmitting test data and raises a field level of a transmission signal when transmitting emergency data.

9. An emergency communication device provided with the self diagnosis function as defined by claim 1, further comprising an alarm which alerts when transmission and reception of the weak signal is not achieved.

10. An emergency communication device provided with the self diagnosis function as defined by claim 6, wherein said CPU prevents an engine from being started when transmission and reception of the weak signal is not achieved.

11. An emergency communication device provided with the self diagnosis function as defined by claim 7, further comprising an alarm which alerts when transmission and reception of the weak signal is not achieved.

12. An emergency communication device provided with the self diagnosis function as defined by claim 8, wherein said CPU prevents an engine from being started when transmission and reception of the weak signal is not achieved.

* * * * *